(12) United States Patent
Stahel et al.

(10) Patent No.: US 7,318,624 B2
(45) Date of Patent: Jan. 15, 2008

(54) MOTORCYCLE DRIVER BACKREST

(75) Inventors: Alwin J. Stahel, St. Paul, MN (US); Brian K. Stahel, New Brighton, MN (US)

(73) Assignee: Kuryakyn Holdings, Inc., Somerset, WI (US)

( * ) Notice: Subject to any disclaimer, the term of this patent is extended or adjusted under 35 U.S.C. 154(b) by 543 days.

(21) Appl. No.: 10/990,023

(22) Filed: Nov. 16, 2004

(65) Prior Publication Data
US 2006/0103213 A1 May 18, 2006

(51) Int. Cl.
*A47C 7/02* (2006.01)
*A47C 15/00* (2006.01)
*E05D 7/06* (2006.01)
*B62J 39/00* (2006.01)

(52) U.S. Cl. .............. 297/230.1; 297/352; 16/239; 280/288.4

(58) Field of Classification Search ............... 297/352, 297/230.1, 374, 378.12; 280/288.4; 16/223, 16/239
See application file for complete search history.

(56) References Cited

U.S. PATENT DOCUMENTS

| | | | |
|---|---|---|---|
| 4,313,639 A | 2/1982 | Ware | 297/366 |
| 4,570,998 A | 2/1986 | Hughes | 297/353 |
| 4,596,422 A | 6/1986 | Stahel | 297/378 |
| 5,588,698 A | 12/1996 | Hsueh | 297/184.11 |
| 6,007,150 A | 12/1999 | Clerkin et al. | 297/215.12 |
| 6,224,081 B1 | 5/2001 | Wayman et al. | 280/288.4 |
| 6,983,992 B2 * | 1/2006 | Oomori | 297/357 |

FOREIGN PATENT DOCUMENTS

DE   3643195 A1 *  6/1988

* cited by examiner

*Primary Examiner*—Milton Nelson, Jr.
(74) *Attorney, Agent, or Firm*—Dicke, Billig & Czaja, PLLC (57) ABSTRACT

A motorcycle driver backrest has a pair of struts that support a backrest pad and are positioned on opposite sides of a motorcycle, where they are pivotally supported on brackets on the motorcycle. The struts have pivot assemblies that attach to the brackets that permit the backrest to be moved from a stopped working position for supporting a back of a motorcycle rider, to a forwardly folded position. The pivot assemblies are locked onto the brackets with latch dogs, and the latch dogs in turn are moveable between latched and unlatched positions with a hand actuator disc accessible from the exterior of the pivot assemblies. When the latch dog is in an unlatched position, the struts can be sprung apart for removal from the brackets.

15 Claims, 7 Drawing Sheets

MOTORCYCLE DRIVER BACKREST

BACKGROUND OF THE INVENTION

The present invention relates to a backrest for a driver of a motorcycle which will pivot forwardly for clearance for a passenger to mount a passenger's seat, and which has pivot assemblies that can be adjusted to different longitudinal positions in a fore and aft direction.

Backrests for motorcycle drivers have been utilized for increasing rider comfort. Some existing backrests permit adjusting the pivot mounting for the backrest in fore and aft direction along brackets on the sides of a motorcycle. However, the mounting is generally complex and requires tools for removing and replacing the pivot mounting. The typical prior art backrest is shown in U.S. Pat. No. 4,596,422.

SUMMARY OF THE INVENTION

The present invention relates to a pivotal mounting for a motorcycle driver backrest that has a pair of pivot support assemblies that can be reliably locked into position on support brackets on a motorcycle, but also quickly removed and/or repositioned longitudinally when desired.

The backrest engages a rearward mechanical stop in its usable position and it will pivot forwardly from its usable position to a second stopped position. The forward pivoting provides clearance for a passenger to mount the motorcycle.

The pivot support assemblies have a quick release lock that locks the pivot supports for the backrest onto the support brackets using an irregularly shaped opening that insures each pivot support is properly oriented when installed and which holds the pivot supports stationary when the backrest is pivoted. The loads on the backrest are carried adequately. The pivot support assemblies are held with a quick release arrangement so the pivot support assemblies can be quickly removed or changed in position.

DETAILED DESCRIPTION OF THE PREFERRED EMBODIMENTS

Figure 1:
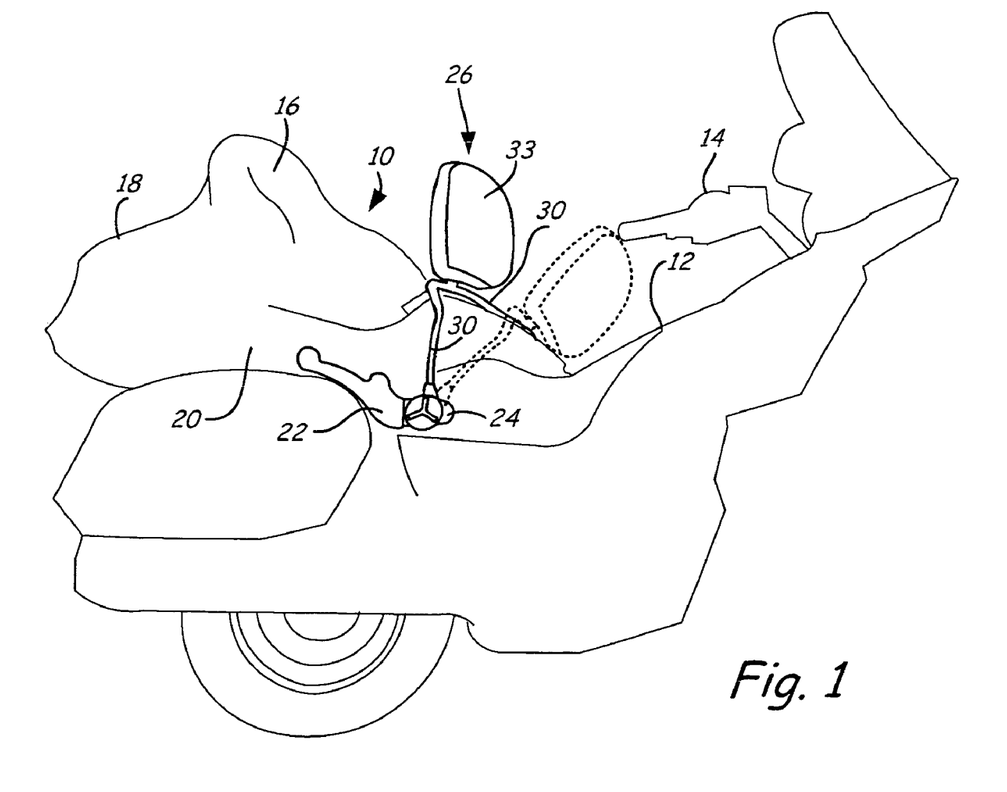
FIG. 1 fragmentarily shows a motorcycle with a backrest made according to the present invention installed thereon at the rear of the driver's seat.

Referring to FIG. 1, a motorcycle is shown fragmentarily at 10, and is of a conventional design. It includes a frame mounting a rider's seat 12 adjacent handlebars 14 and it has a passenger seat 16. A trunk is shown generally at 18. The frame of the motorcycle or other structural members extend upwardly along to the inside of the side panels 20 of the trunk.

A driver's backrest mounting bracket 22 is secured to the panel 20 or to any suitable portion of the frame on each side of the motorcycle. A separate backrest mounting bracket 22 is mounted on each side of the motorcycle, and the mounting brackets 22 have forwardly projecting strap portions 24 onto which a backrest assembly 26 is mounted.

Figure 5:
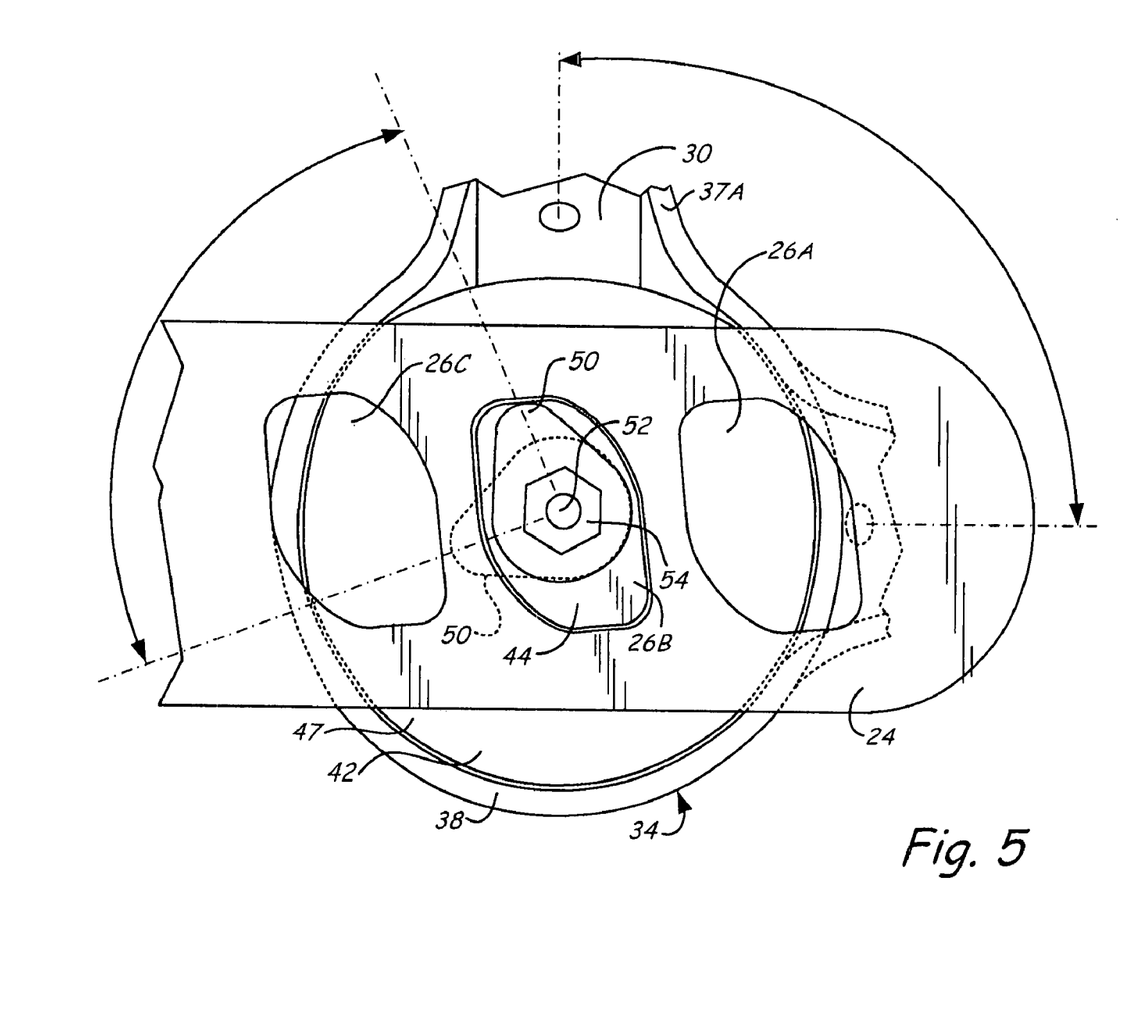
FIG. 5 is a view from an interior side of the left hand pivot support assembly of a motorcycle showing the mounting bracket used with the backrest of the present invention.

The backrest assembly 26 includes a pair of support struts 30 that each have a pivot support assembly 32 at the lower end. The struts 30 support a backrest pad 33 in a suitable manner. Referring to FIG. 5, which is a view from the interior side of the left hand bracket strap 26 and pivot support assembly 32, it can be seen that the forwardly extending strap 24 has three irregularly shaped, polygonal openings 26A, 26B, and 26C formed therein. A separate pivot support assembly 32 supports each of the struts 30. The brackets 22 are mounted on suitable structural elements of the motorcycle that have sufficient strength to support the backrest.

The pivot support assemblies 32 are supported on the brackets 22 and are releasably mounted for quick adjustment along (fore and aft), or removal from, the brackets.

Figure 6:
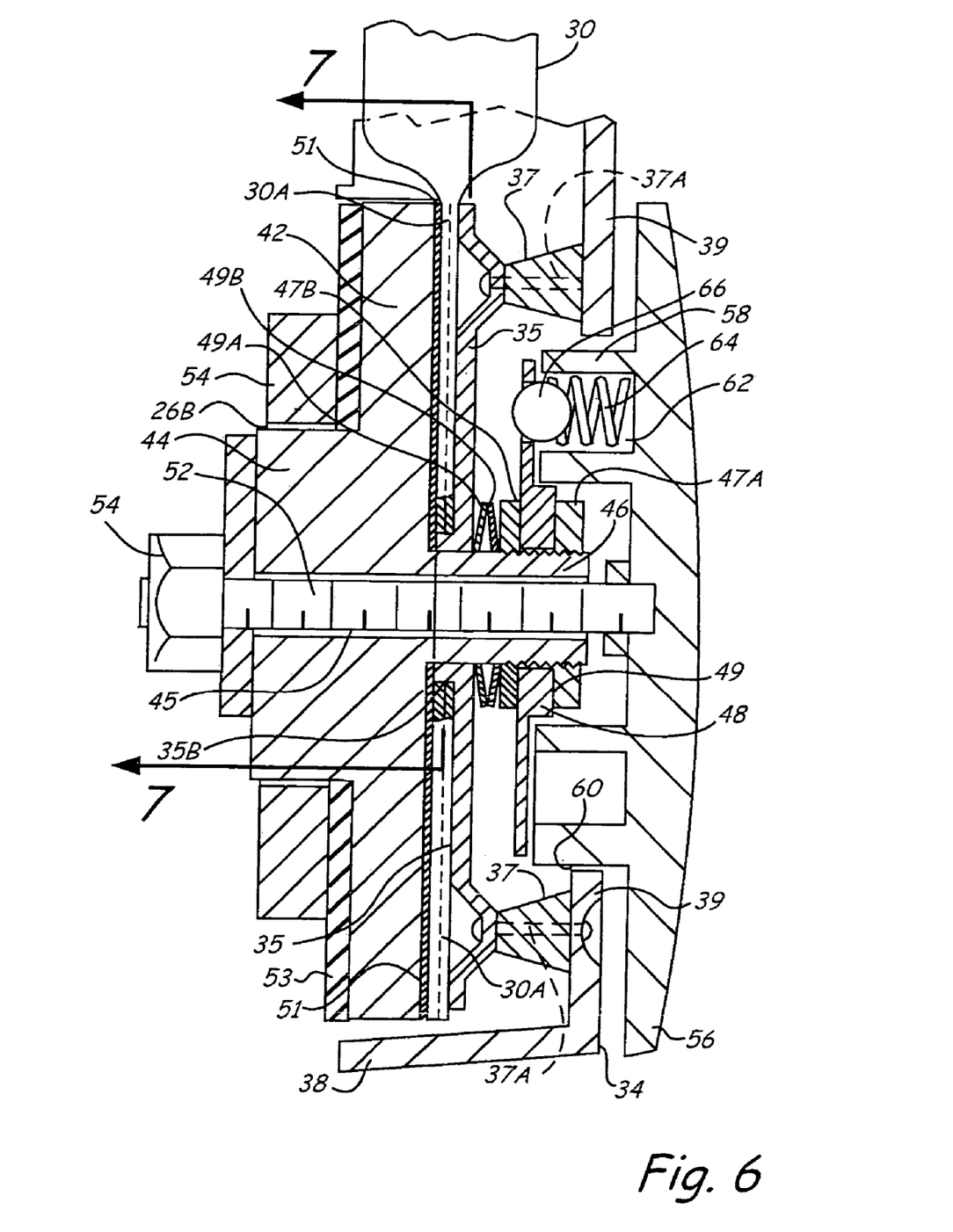
FIG. 6 is an enlarged sectional view taken along FIG. 6-6 in FIG. 4.

Referring to FIGS. 3-6 in particular, each pivot support assembly 32 includes a strut support disc 35 that has a lower flattened end 30A of the strut 30 on each side of the motorcycle. The flattened ends 30A are fixed (welded) to the strut support disc 35 (FIG. 6). The flattened ends 30A have holes that fit over a hub 35 at the center of the respective strut support disc and the flattened end extends across the diameter of the strut support disc. A cover housing 34 has stand off lugs 37 and rivets or fasteners 37A are used to fix the housing 34 to the respective strut support disc 35.

Figure 4:
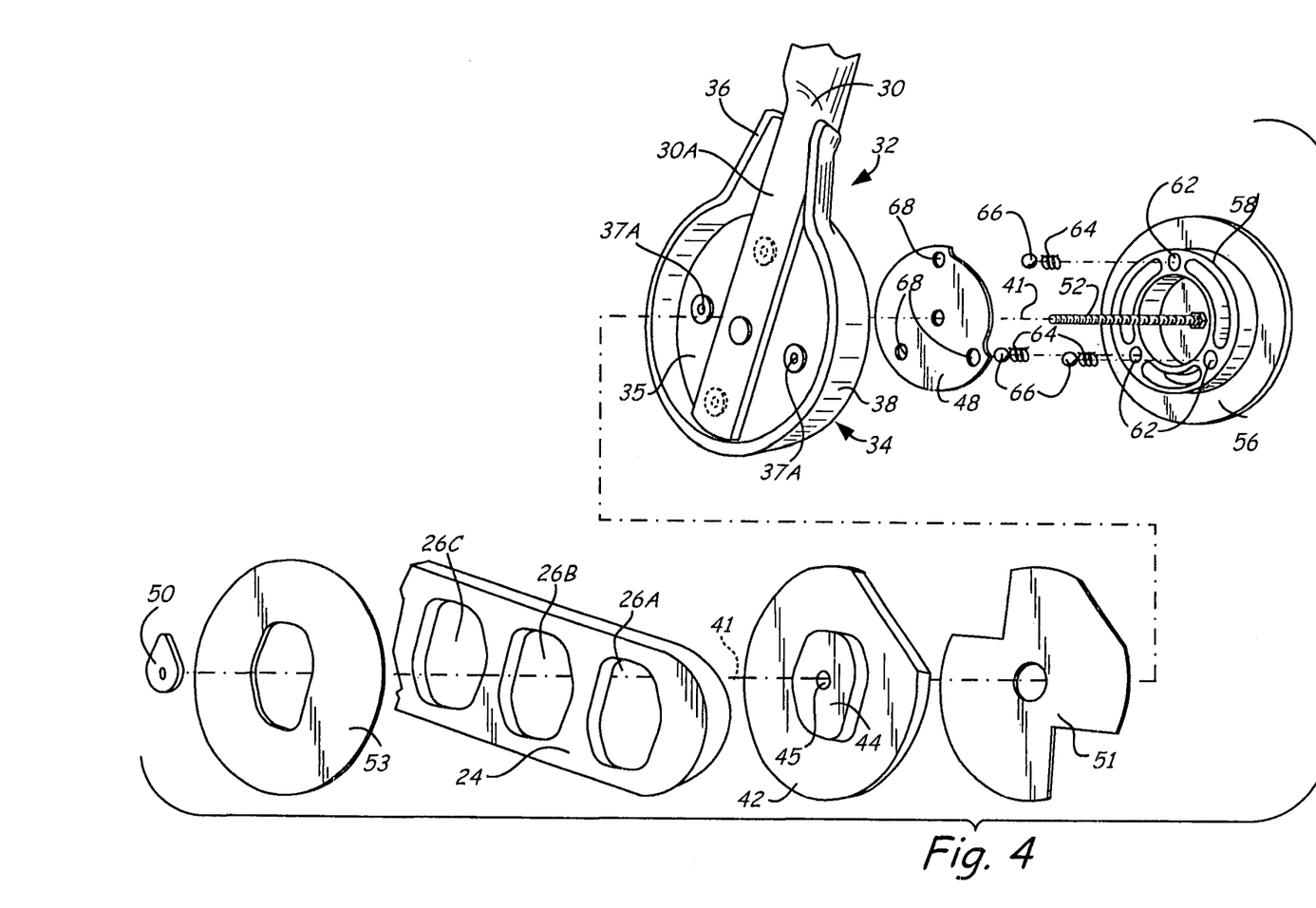
FIG. 4 is an exploded view of FIG. 2 showing the parts used with the same pivot support shown in FIG. 2.

The housing 34 on each side has an open neck 36 that receives the strut and a part annular flange 38 that extends around a central axis 41 of the support assembly 32 (FIG. 4). A mounting pivot disc 42, as shown in FIG. 6, has a sleeve 46 that extends to one side and which pivotally supports the hub 35B of strut support disc 35 so the struts 30 can pivot between the desired portions.

The pivot disc support lug 44 that is integral with the pivot disc 42 is formed on a side of the disc opposite from sleeve 46. The lug 44 mounts the respective pivot disc 42 and the entire pivot support assembly 32 to the respective brackets 24. A central bore 45 is formed in the sleeve 46 and the pivot disc 42. The strut support discs 35 and housings 34 are thus pivotally mounted relative to the respective pivot disc 42 through the mounting of hub 35B of disc 35 on sleeve 46. The struts 30 pivot with the respective disc 35 on the respective sleeve 46.

A detent disc or ring 48 is slid onto the exterior of each sleeve 46 at the outer end of the sleeve and held in place with a pair of adjustable jam nuts 47A and 47B that thread onto the exterior of sleeve 46 on opposite sides of the disc 48. The detent disc or ring 48 is thus held relative to the sleeve 46. The jam nuts 47A and 47B can be reliably secured in place. Thus, the detent ring remains in a fixed position relative to the pivot disc 42. The strut support disc 35 and the flat end portion 30A of the respective strut are urged toward the radial flange surface of the respective pivot disc 42 with a pair of Belleville washers 49A and 49B that are between jam nut 47B and the pivot disc 35. The Belleville washers 49A and 49B are mounted as shown and are spring loaded. Adjusting jam nut 47B changes the spring load so a desired resistance to pivoting of the backrest can be provided. A low friction material disc 51 is between the flattened end 30A of the strut and the radial flange side surface of pivot disc 42.

The support lug 44 on the pivot disc 42 is of size and shape to extend through one of the openings 26A, 26B or 26C of one of the brackets 22, and the support lug 44 has an axially length substantially the same as, or slightly longer than, the thickness of the strap portion 24 of the respective mounting bracket 22. A low friction material spacer 53 can be used to get the proper position of the outer end of lug 44. The irregular (polygonal) shape of openings 26A-C and the lug 44 are oriented so the pivot assemblies will always be at the proper rotational position when the lugs 44 are in place.

Figure 2:
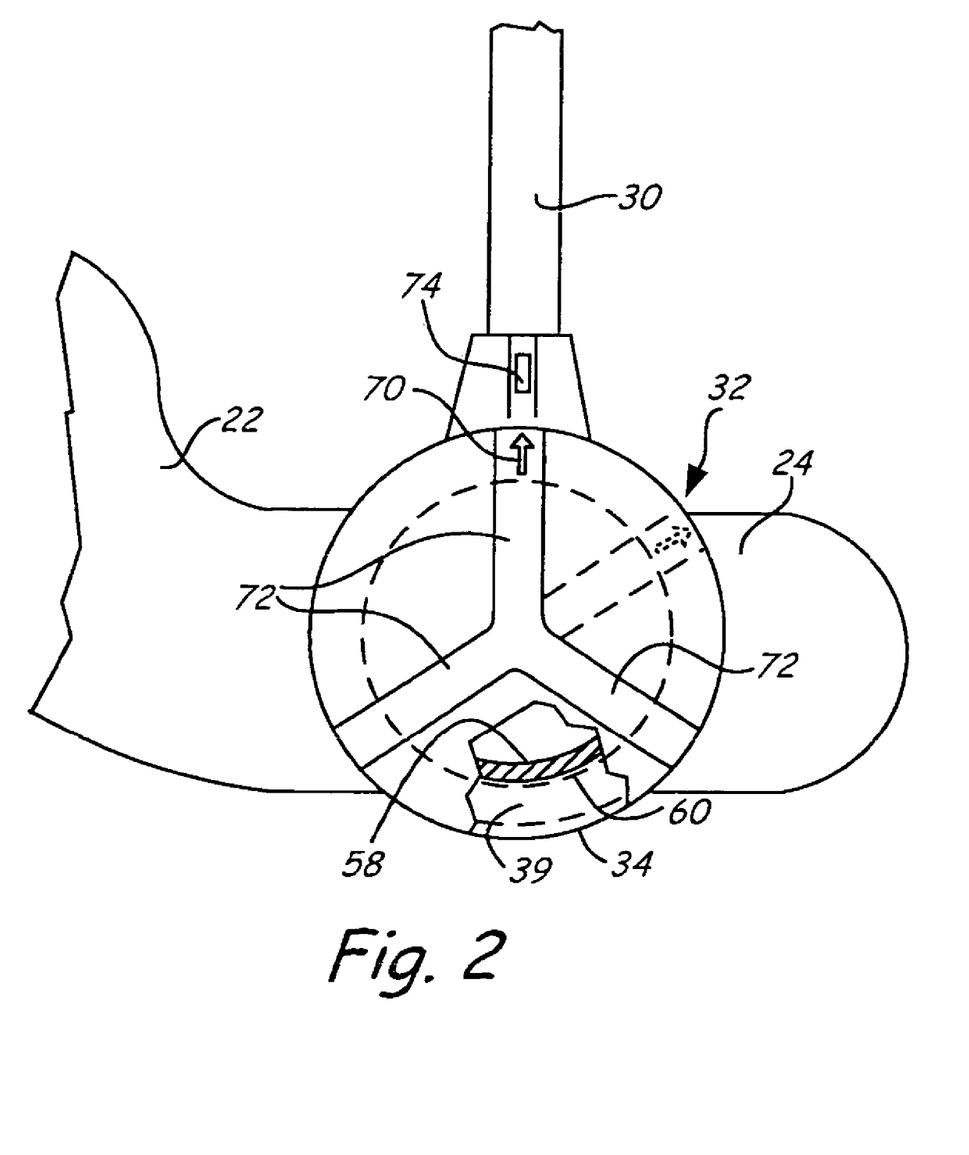
FIG. 2 is an enlarged side view of the right hand pivot support assembly shown in FIG. 1.
Figure 3:
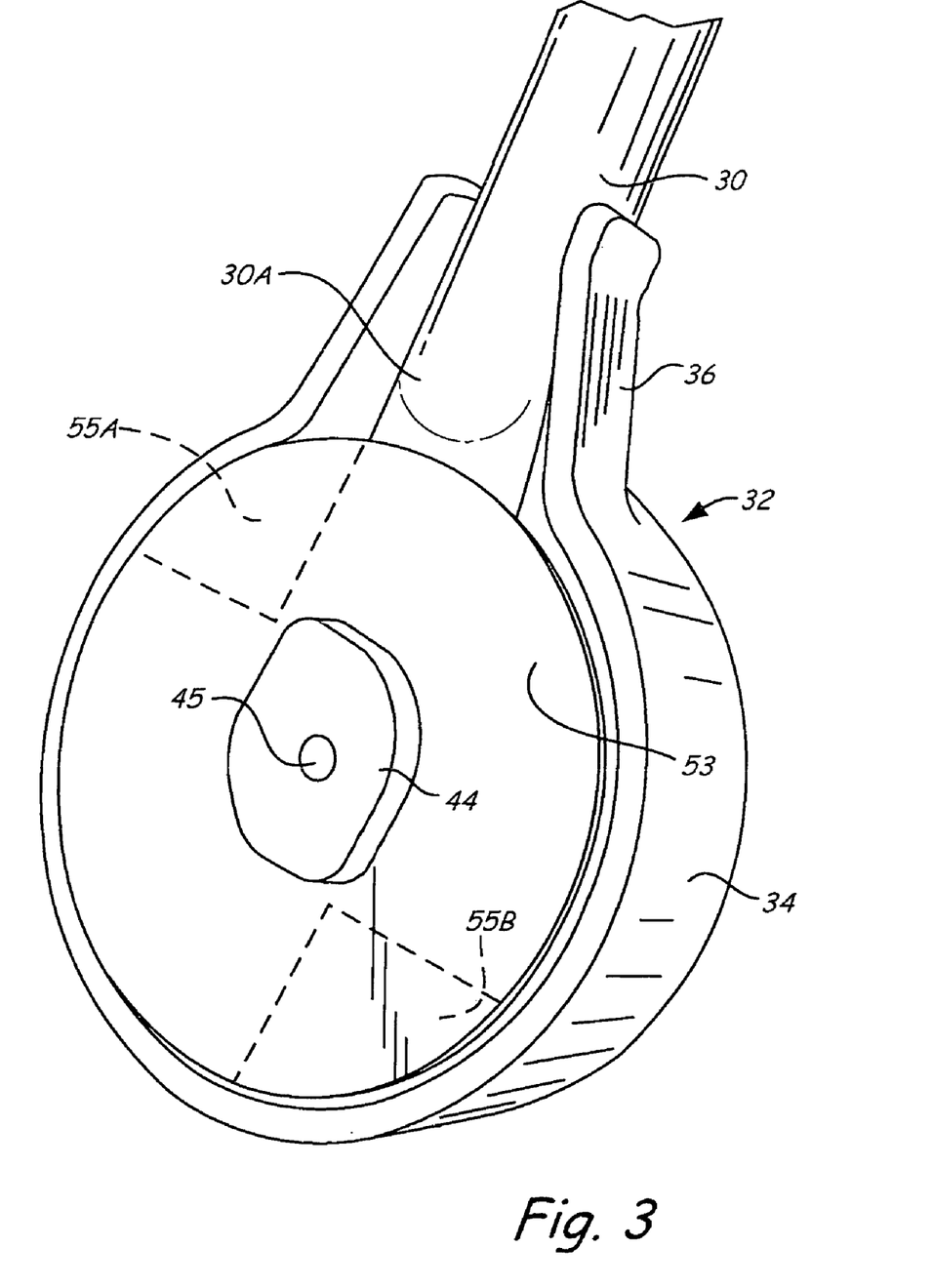
FIG. 3 is a perspective view of the inside of the left hand pivot support assembly for the backrest shown in FIG. 1.

A latch cam or dog 50 is non-rotatably held on a central bolt or pin 52 that passes through the bore 45 in the pivot disc 42, in sleeve 46 and support lug 44. The latch dog 50 slidably rests on the outer end surface of lug 44. The other end of the bolt or pin 52 is non-rotatably secured to a hand actuator disc 56. The lock dog 50 is threaded onto the bolt or pin at the desired location that permits rotating the latch dog. The latch dog is held in place on the central bolt or pin 52 with a suitable lock nut 54. The hand actuator disc 56 has a hub 58 that is rotatably guided for rotation within an opening 60 in the wall 39 (FIGS. 2 and 6). The hub 58 has three pockets shown at 62 that have springs in the pockets 64 which spring load detent balls 66 in an axial direction to engage and releasably seat in openings 68 in the detent disc or ring 48.

The strut support disc 35 supports the wall 39 of the housing 34, as previously explained. The pivot disc 42 is secured to the bracket 22 and forms a stationary support. Each sleeve 46 rotatably supports the associated hub 35B, the strut support disc 35, the respective strut 30 and housing 34 when in a working assembly as shown in cross-section in FIG. 6. The pivot disc 42 periphery fits within the flange 38 of the housing 34.

The pivot discs 42 are mounted in the brackets 22, on the sides of the motorcycle. The struts 30, strut support discs 35, and housings 34 will pivot about the axis 41 relative to the pivot discs 42, and thus will pivot relative to the brackets 22 and the motorcycle.

It has been explained that the detent disc 48 is secured to the pivot disc 42, so detent disc or ring 48 and the hand actuator disc remain with the disc 42 when the backrest is pivoted and do not pivot or rotate. The hand actuator disc 56, which mounts to screw 52 and controls the rotational position of the lock dog or cam 50, will remain in its position relative to the pivot disc 42 until the hand actuator disc is rotated with manual force to move from its detented position.

Figure 7:
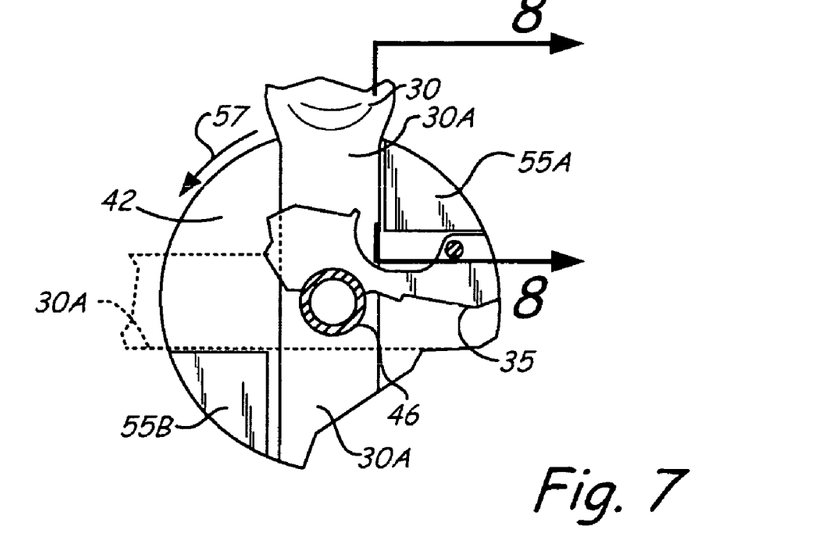
FIG. 7 is a fragmentary sectional view taken on line 7-7 in FIG. 5.
Figure 8:
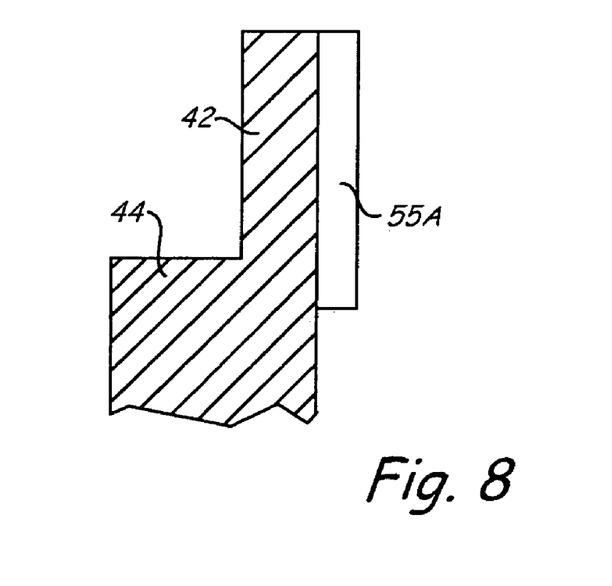
FIG. 8 is a fragmentary sectional view taken on line 8-8 in FIG. 7.

The pivot disc 42 has pre-shaped or wedge shaped fixed stop lugs 55A and 55B projecting from the side surface opposite from the support lug 44. As can be seen in FIG. 7, in one relative pivotal position of the struts 30 and the disc and housing, one edge of each of the flattened portions 30A of the struts 30 will engage a respective first stop lug 55A. FIG. 7 shows one of the struts 30 in its usable or working position with the strut extending generally uprightly. The struts 30, support discs 35, and the housing 34 can be rotated in direction as indicated by the arrow 57, so that the second edges of the flattened portions 30A of the struts 30 will engage a respective second stop lug 55B that is shown in dotted lines in FIG. 7 as well. The struts 30 can pivot forwardly and lower the backrest down toward the driver's seat. The pivot amount permitted is about 90 degrees, between the stops, but the backrest may not have to be pivoted that much to provide passenger clearance. FIG. 8 shows the stop face of lug 55A.

The pivot disc 42 is fixed relative to the brackets 22 so the stops 55A and 55B are also fixed relative to the motorcycle. The stops limit the pivoting movement of the rider backrest assembly.

The latch dog 50 is held securely on the pin or screw 52 so that it will rotate positively when the hand actuator disc 56 is rotated relative to the pivot disc 42. The detent balls 66 will retract against the springs 64 so that the rotation of the latch dog 50 can take place for removal of the struts 30 from the brackets 22. The hand actuator disc 56 will not rotate unintentionally.

The latch dog 50 will move between a solid line position shown in FIG. 4 where the lug 44 can be withdrawn from the opening 26B and the pivot disc 42, the housing 34 and the respective strut 30 can be removed from the bracket 22, and either moved to a different opening in the strap portion 24 at each side of the motorcycle, or left off, if the backrest is not needed or desired.

When the latch dog 50 is moved by turning the hand actuator disc 56 substantially 60 degrees, the latch dog 50 moves to its dotted line position in FIG. 4 and will lock the hub 44 in the aperture on the strap 24 so that the pivot assembly cannot be removed from the bracket strap 24. The locked position of the hand actuator disc is the detented positions, so the latch dog 50 will securely hold the struts and the backrest in place. The locked position of the hand actuator disc 56 is shown in FIG. 2 where an indicator arrow 70 on one of three raised ribs 72 aligns with a mark 74 on the housing 34.

Struts 30 can be flexed outwardly far enough so that the respective support lug 44 and the latch dog 54 will clear the brackets 22 so that the backrest can be removed.

The latch dog 50 is operated by the hand actuator disc 56 for locking the pivot disc in position on the bracket mounted on the motorcycle. The latch dog 50 can be moved to a position where it will pass through the opening for the support lug 44 on the pivot disc. The backrest can be removed and replaced, or repositioned without special tools, and it can be done quickly, efficiently and positively. The backrest will remain locked in place in use because the detenting of the hand actuator disc 56 in its locked position.

When the backrest is pivoted forwardly, the hand actuator disc remains in its locking position, since the support disc 35 moves, but the pivot disc 42 detent ring 48, the hand actuator disc 56 and the latch cam or dog 50 do not rotate and remain stationary.

Although the present invention has been described with reference to preferred embodiments, workers skilled in the art will recognize that changes may be made in form and detail without departing from the spirit and scope of the invention.

What is claimed is:

1. A mounting assembly for mounting an end of a strut of a backrest for a motorcycle to a support bracket, the support bracket having a non-circular mounting opening therein, a pivot assembly including a pivot disc having a support lug adapted to fit within the non-circular opening of the support bracket, a support strut pivotally mounted relative to the pivot disc on a pivot axis, said pivot disc having a central bore centered on the pivot axis, a latch dog rotatably mounted in a position fixed axially relative to the pivot disc and at an outer end of the lug and rotatable relative to the pivot disc, and a hand actuator for moving the latch dog from an unlatched position wherein the latch dog will pass through the non-circular opening of the bracket, to a latched position where the axial position of the latch dog permits the latch dog to be positioned on an opposite side of the support bracket to lock the support lug in the non-circular opening of the support bracket.

2. The assembly of claim 1 and a housing supported on the strut, said housing having a part annular flange overlying an outer periphery of the pivot disc, the housing having an outer end wall, and a hand actuator disc rotatably mounted relative to the housing on an outer side of the outer end wall, a drive connection between said hand actuator disc and the latch dog, whereby rotation of the hand actuator disc moves the latch dog between its latched and unlatched positions.

3. The assembly of claim 2 and a detent for releasably detenting the hand actuator disc in the position with the latch dog in its latched position.

4. The assembly of claim 1, wherein the pivot disc is supported adjacent the bracket when installed on a support bracket, and the strut is pivotally mounted relative to the pivot disc on a side of the pivot disc opposite from the support bracket, and a pair of stop lugs spaced apart on the opposite side of the pivot disc fir engaging a portion of the strut and stopping pivoting of the strut in selected pivotal positions relative to the pivot disc.

5. The assembly of claim 4, wherein said support disc is pivotally mounted on an outwardly extending sleeve forming part of said pivot disc.

6. The assembly of claim 4, wherein there is a support disc secured to a lower end of the strut, the support disc being pivotally mounted on the pivot disc, said support disc being fixedly mounted on said housing and within the flange of the housing.

7. The assembly of claim 6, wherein said strut has a flattened end portion that is secured on the support disc, said stop lugs on the pivot disc engaging edges of the flattened end portion of the strut to stop pivoting of the strut.

8. A pivot mount comprising a strut and a bracket adapted to be mounted onto a motorcycle, said bracket having at least one opening therein with a central axis positioned generally parallel to the ground when installed on a motorcycle, a pivot disc for pivotally mounting the strut for pivotal movement between two positions, the pivot disc having a planar surface facing the bracket, a lug protruding from the planar surface and shaped to fit an opening in the bracket, a latch dog rotatably mounted adjacent an end of the lug and protruding outwardly from a perimeter of the lug in a latched position, and being within a perimeter of the lug in a released position, the latch dog passing through the opening in its released position, and being pivotable from a side of the pivot disc opposite from the bracket to its latched position, and being pivotable from a side of the pivot disc opposite from the bracket to its latched position, the latch dog pivoting to its latched position when on an opposite side of the bracket from the pivot disc.

9. The pivot mount of claim 8, wherein the latch dog is mounted on a pivot pin passing through a center bore in the pivot disc, and a manual actuator for moving the pivot pin about an axis to move the latch dog between its latched and released positions, said manual actuator being positioned on an outer side of the pivot disc.

10. The pivot mount of claim 9, wherein said pivot disc has a sleeve extending therefrom on a side of the pivot disc opposite from the lug, and a backrest support pivotally mounted on said sleeve and movable between a backrest useable position and a backrest folded position.

11. The pivot mount of claim 10, wherein said manual actuator is on an outer side of the backrest support.

12. The pivot mount of claim 10, wherein said sleeve mounts a detent ring on an outer side of the backrest support, and the manual actuator comprising a rotating disc having a detented position with the latch dog in its latched position.

13. The pivot mount of claim 8, wherein said pivot disc has a sleeve extending therefrom on a side opposite from the lug, a backrest support comprising a support disc rotatably mounted onto the sleeve, a housing spaced from the support disc in an outward direction and connected to the support disc, a detent ring positioned between an outer wall of the housing and the support disc, and the housing having a flange extending at least partially around the periphery of the pivot disc, the support disc, and the detent ring.

14. A pivot mount for a pivoting strut for a motorcycle backrest comprising a pivot disc for pivotally mounting a backrest for pivotal movement between two positions, the pivot disc having a first side surface, a lug protruding from the first side surface and having a shaped perimeter and positioned at an outer end of the lug and a latch dog rotatably mounted adjacent an end of the lug and protruding outwardly from the perimeter, in a latched position, and being within the perimeter of the lug in a released position, and a pivot pin passing through a center bore in the pivot disc, the latch dog being mounted on and rotatable with the pivot pin, a manual actuator for moving the pivot pin about an axis to move the latch dog between its latched and released positions, said manual actuator being positioned on an outer side of the pivot disc, a backrest support pivotally mounted on said pivot disc and movable between a backrest useable position and a backrest folded position, and a backrest support strut mounted on the backrest support.

15. The pivot mount of claim 14 wherein the backrest support comprises a support disc rotatably mounted on the pivot disc, a housing spaced from the support disc, a support disc in an outward direction and connected to the support disc, a detent ring positioned between an outer wall of the housing and the support disc, a hand actuator mounted on the pivot pin to an outer side of the outer wall of the housing and having detent devices engaging the detent ring with the latch dog in its latched position, and the housing having a flange extending at least partially around the periphery of the pivot disc, the support disc, and the detent ring.

* * * * *

UNITED STATES PATENT AND TRADEMARK OFFICE
CERTIFICATE OF CORRECTION

| | |
|---|---|
| PATENT NO. | : 7,318,624 B2 |
| APPLICATION NO. | : 10/990023 |
| DATED | : January 15, 2008 |
| INVENTOR(S) | : Alwin J. Stahel and Brian K. Stahel |

Page 1 of 1

It is certified that error appears in the above-identified patent and that said Letters Patent is hereby corrected as shown below:

Column 5, line 20, delete "fir" and insert in place thereof --for--.

Signed and Sealed this

Twentieth Day of May, 2008

JON W. DUDAS
*Director of the United States Patent and Trademark Office*